(12) United States Patent
Raghupathy et al.

(10) Patent No.: US 8,020,119 B2
(45) Date of Patent: Sep. 13, 2011

(54) ENGINE SUPPORT FOR PARSING CORRECTION USER INTERFACES

(75) Inventors: Sashi Raghupathy, Redmond, WA (US); Ming Ye, Bellevue, WA (US); Victoria H. Chou, Castro Valley, CA (US)

(73) Assignee: Microsoft Corporation, Redmond, WA (US)

( * ) Notice: Subject to any disclaimer, the term of this patent is extended or adjusted under 35 U.S.C. 154(b) by 910 days.

(21) Appl. No.: 11/956,631

(22) Filed: Dec. 14, 2007

(65) Prior Publication Data

US 2009/0158219 A1    Jun. 18, 2009

(51) Int. Cl.
*G06F 3/048* (2006.01)
*G06F 3/14* (2006.01)

(52) U.S. Cl. ........ 715/863; 715/765; 715/810; 345/173; 345/179; 382/229

(58) Field of Classification Search .................. 715/700, 715/727, 764, 765, 808, 809, 810, 841, 843, 715/835, 846, 863; 345/156, 173, 179; 382/177, 382/186, 187, 202, 229
See application file for complete search history.

(56) References Cited

U.S. PATENT DOCUMENTS

| | | | |
|---|---|---|---|
| 5,517,578 A | | 5/1996 | Altman et al. |
| 5,621,871 A | | 4/1997 | Jaremko et al. |
| 5,655,136 A | * | 8/1997 | Morgan .......................... 382/187 |
| 6,687,876 B1 | | 2/2004 | Schilit et al. |
| 7,218,783 B2 | | 5/2007 | Bargeron et al. |
| 7,343,041 B2 | * | 3/2008 | Kwok et al. ................... 382/187 |
| 7,756,335 B2 | * | 7/2010 | Sternby ......................... 382/186 |
| 2002/0060702 A1 | * | 5/2002 | Sugimoto et al. ............. 345/864 |
| 2004/0027381 A1 | * | 2/2004 | Jaeger ........................... 345/764 |
| 2004/0205482 A1 | | 10/2004 | Basu et al. |
| 2004/0205542 A1 | | 10/2004 | Bargeron et al. |
| 2005/0281467 A1 | * | 12/2005 | Stahovich ...................... 382/202 |
| 2006/0050969 A1 | | 3/2006 | Shilman et al. |
| 2006/0274051 A1 | * | 12/2006 | Longe et al. .................. 345/173 |
| 2007/0157076 A1 | | 7/2007 | Lin et al. |
| 2007/0174761 A1 | | 7/2007 | Lin et al. |

OTHER PUBLICATIONS

A Simple Approach to Recognise Geometric Shapes Interactively (9 pgs.) http://immi.inesc-id.pt/publication.php?publication_id=48 .
Parsing Ink Annotations on Heterogeneous Documents (8 pgs.) http://www.shilman.net/papers/wang_annotations_eurogfx06.pdf.
Recognizing Freeform Digital Ink Annotations (12 pgs.) http://www.shilman.net/papers/shilman_annotations_das04.pdf.

* cited by examiner

*Primary Examiner* — Xiomara L Bautista
(74) *Attorney, Agent, or Firm* — Merchant & Gould P.C.

(57) ABSTRACT

A parsing system provides a parsed document to a user application labeling the document with indication symbols according to a scheme associated with the parsing results. Users are enabled to insert correction indicators such as handwritten gestures, icon selections, menu item selections, and the like in conjunction with the indication symbols. The document is re-analyzed performing the requested corrections such as line or block separations, line, block, word connections, etc. The operations provide support for the engine stack of the parsing system while accommodating independent user interfaces employed by the users. Insertion of correction indicators and subsequent re-analysis for correction may be performed upon user signal, in an iterative manner, or continuously.

18 Claims, 8 Drawing Sheets

Line Dividers:

Line Connector:

Block Divider:

Block Connector:

Add Paragraph Start:

Remove Paragraph Start:

ENGINE SUPPORT FOR PARSING CORRECTION USER INTERFACES

BACKGROUND

As mobile devices are surpassing desktop computers in shipment growth and tablet features are becoming part of mainstream mobile computing, pen-based input is established as a core user experience. Parsing technologies analyze the structures within digital ink to enable advanced editing, searching and conversion features. These features are compelling reasons for pen-based mobile note-taking and tablet adoption.

Corrections of parsing results are an important part of parsing systems. While some results may be automatically corrected through complicated algorithms, many require the user's feedback such as correct grouping of words, corrected forming of bulleted or numbered lists, lining of words or word groups, and the like.

The challenges for a parsing platform in interacting with a user include exposing parsing results to the user, allowing the user to manipulate the results, and providing parsing engines with feedback that they can incorporate and persist. Solutions to these problems may differ considerably across different parsing domains such as note taking and diagramming.

SUMMARY

This summary is provided to introduce a selection of concepts in a simplified form that are further described below in the Detailed Description. This summary is not intended to identify key features or essential features of the claimed subject matter, nor is it intended as an aid in determining the scope of the claimed subject matter.

Embodiments are directed to a parsing platform that provides parsed handwriting labeled with indication symbols to a user for corrections. User feedback as gestures or in other forms is provided to parsing engine stack for re-parsing and correction of parsing errors. Corrected document may be provided to a user application for displaying to the user or other processes.

These and other features and advantages will be apparent from a reading of the following detailed description and a review of the associated drawings. It is to be understood that both the foregoing general description and the following detailed description are explanatory only and are not restrictive of aspects as claimed.

DETAILED DESCRIPTION

As briefly described above, engine support for parsing correction user interfaces is provided through acceptance of user feedback in form of gestures or similar input on displayed parsed handwriting labeled with indication symbols. In the following detailed description, references are made to the accompanying drawings that form a part hereof, and in which are shown by way of illustrations specific embodiments or examples. These aspects may be combined, other aspects may be utilized, and structural changes may be made without departing from the spirit or scope of the present disclosure. The following detailed description is therefore not to be taken in a limiting sense, and the scope of the present invention is defined by the appended claims and their equivalents.

While the embodiments will be described in the general context of program modules that execute in conjunction with an application program that runs on an operating system on a personal computer, those skilled in the art will recognize that aspects may also be implemented in combination with other program modules.

Generally, program modules include routines, programs, components, data structures, and other types of structures that perform particular tasks or implement particular abstract data types. Moreover, those skilled in the art will appreciate that embodiments may be practiced with other computer system configurations, including hand-held devices, multiprocessor systems, microprocessor-based or programmable consumer electronics, minicomputers, mainframe computers, and the like. Embodiments may also be practiced in distributed computing environments where tasks are performed by remote processing devices that are linked through a communications network. In a distributed computing environment, program modules may be located in both local and remote memory storage devices.

Embodiments may be implemented as a computer process (method), a computing system, or as an article of manufacture, such as a computer program product or computer readable media. The computer program product may be a computer storage media readable by a computer system and encoding a computer program of instructions for executing a computer process.

Figure 1:
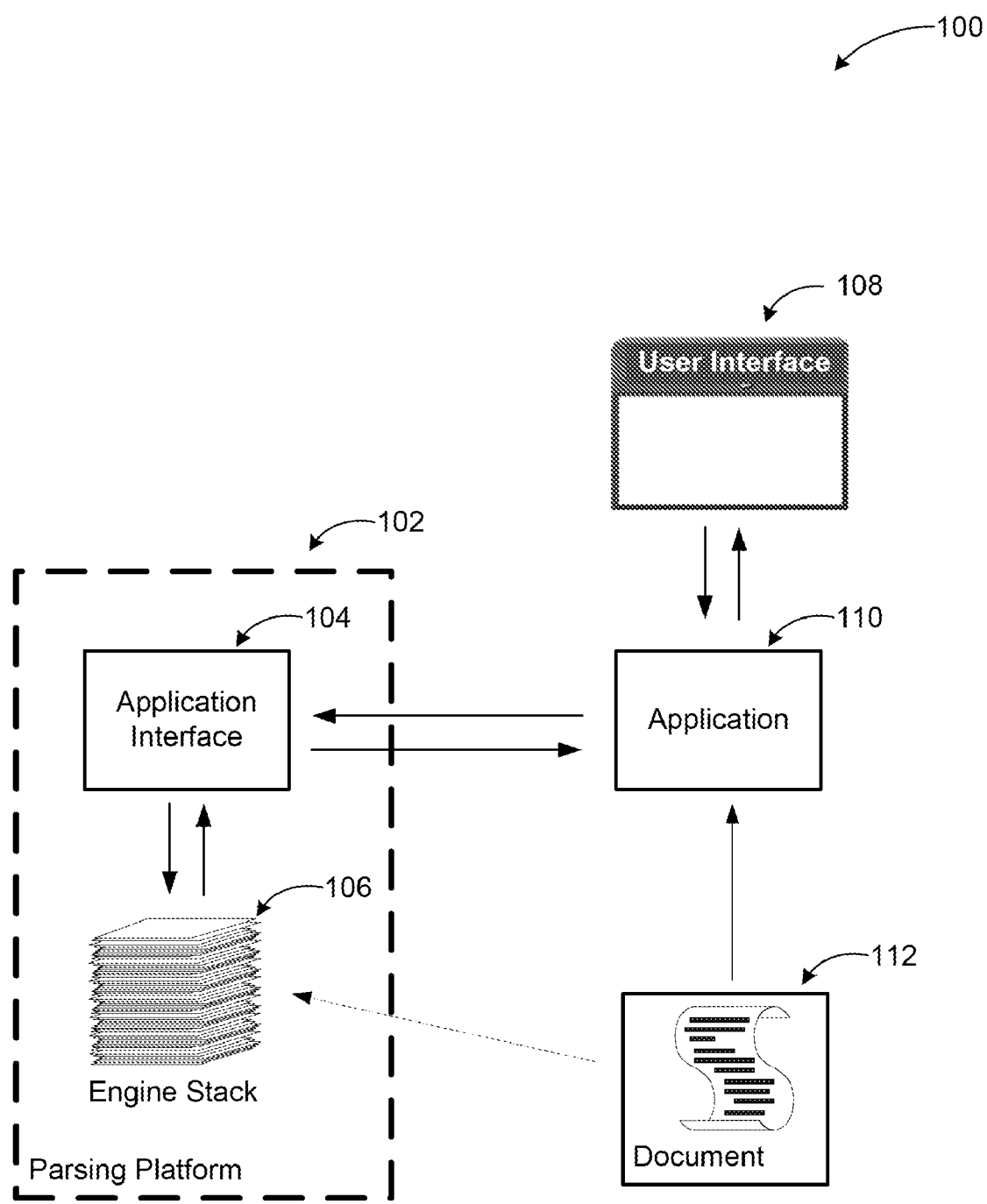
FIG. 1 is a conceptual diagram illustrating an ink recognition system with a parsing platform providing support for parsing engines in conjunction with parsing correction user interfaces.

Referring to FIG. 1, a conceptual diagram of an ink recognition system with a parsing platform providing support for parsing engines in conjunction with parsing correction user interfaces is illustrated. Engine support for parsing correction user interfaces may be implemented as part of the engine stack or as a separate module within the parsing platform, or as part of the user application for ink entry.

The targeted domain of a parsing platform according to embodiments is writing-centric note taking. Engine support is provided for the interaction model compatible with key user interface components. In note taking, editing during note taking and correction upon note completion (bulk correction) are two major scenarios that require intensive user-engine interactions. Sharing many components, the bulk correction scenario does not involve new ink. A system according to embodiments exposes parsing results to the users and enables them to correct the results to their satisfaction with a minimum amount of hints.

Conventional parsing correction efforts mostly focus on user Interface (UI) designs with little consideration on engine support with the consequence that the UIs are often simplistic, overly complex, or impractical. Real users are not parsing data labelers; they expect the application to correct itself upon minimal hints instead of themselves to laboriously correct everything. If too little engine support is assumed, the UI has to either scope down to some simple correction tasks or scale up to a data labeling like design. If too much engine support is assumed, no matter how appealing the UI design may be, it may have to be shelved until the engine support catches up. One conventional argument for independent UI and engine design is that it provides the most design freedom. However, a tighter UI-engine integration may actually allow more UI design freedom. A powerful parse engine opens up a whole new space of UI possibilities—some seemingly formidable UI tasks become accomplishable.

A parsing platform according to embodiments allows for arbitrary order of correction resulting in increased user freedom and appropriate propagation to minimize the number of corrections. By preserving correction history, entire correction history can be respected—i.e. later corrections do not undo non-conflicting corrections made earlier—and in case of conflicts, later corrections can prevail. Moreover, reparse engine configuration can be minimized for enhanced performance. In a preferred embodiment, the number of correction types may be minimized to reduce cognitive load.

The integrated engine support/user interface approach also enables more optimal end-to-end design. Moreover, engine support feasibility may guide UI designs. For example, two alternative UI designs may be used for column divider. One is to lasso-select strokes and pin them to "belonging to one column". This approach may be supported by finding out the stroke set to exclude from the pinned column and caching a "belonging to different regions" hint for these two stroke sets. Finding the stroke set to exclude is not trivial. Caching the hint is resource-expensive, not to mention editing the sets on stroke addition or deletion. On examining every pair merging hypothesis, the region grouping engine has to check that it does not violate any "belong to different regions" hints and each check can involve expensive set intersection operations. Furthermore, each "belonging to different regions" hint also implies a number of "belonging to different lines" hints that the line grouping engine needs to respect. The other design approach is to draw a divider gesture stroke between the columns to separate. Hint maintenance is much more resource-friendly for this option. Existing engines may already work extensively with dividers. Adding a new type would not complicate the operations.

In the integrated approach, correction mechanism can influence engine designs as well. For example, the parse engines may have a certain pipeline that if correction proceeds in the order of lines→writing regions→words, the modifications to the engines may be kept minimal. However, the idea of forcing the strict order onto end users may not be desirable. Thus, the parse engines may need to be enhanced to support the scenario that the most annoying error needs to be corrected first no matter what structures it involves. That is also critical to minimize the number of operations needed.

User feedback in parsing correction may be classified as "hard pinning" and "soft pinning". A hard pinning confirms certain properties (such as grouping) of an existing tree node and forbids any future tampering. For example, a hard-pinned line node cannot be split or merged with other strokes. A soft pinning is less rigid—a soft-pinned line should more or less stay as one line although some minor edits such as 'i' dots and 't' crosses are allowed. Hard pinning may give the user a sense of control and security—when the parsing engine makes stubborn mistakes, the user can have the final say using hard pinning. Also, hard pinning is much easier to support for the engines.

In a parsing platform according to embodiments, depending on the input mechanism, hints can be classified into gesture type and stroke-set type. Assuming the user is no longer modifying the note content in the bulk correction scenario, new ink strokes may be interpreted as corrective gestures. Each gesture may be interpreted in the context of visual cues and existing parsing results. For example, a vertical stroke crossing an existing line and its visual cue may be interpreted as a divider gesture for the over-grouped line. According to some embodiments, stroke-set hints may be created by lasso selection (holding a barrel button) followed by a symbol gesture. These two types of hints may also be unified according to other embodiments. The gesture hint may be considered an indirect form of stroke-set hints that require a parsing/translation process. For example, a line divider gesture may be converted to an "in separate lines" hint for the left and right stroke sets. The stroke set hint may be relaxed to a gesture hint too if the lasso stroke is considered as a gesture and delay its interpretation.

While corrective gestures are used as example user feedback for corrective actions on parsed document, embodiments are not limited to gestures. Other forms of input such as clicking on icons, selecting items from a pop-up menu, selecting items from a marking wheel, and the like may also be implemented for parsing engine support using the principles described herein.

Any hint, either "hard pinning" or "soft pinning", has three types of effects on the parsing results: immediate effect, propagated effect, and persisted effect. For instance, when pinning a misclassified drawing stroke into writing, the immediate effect is to convert the stroke type; the propagated effect includes grouping the new writing stroke into an appropriate line, updating the region grouping, word breaking and outline analysis results due to the line change, and any other changes triggered in the chain reaction; and the persisted effect is that this stroke should stay as writing withstanding propagated effects of any future edits unless the user explicitly overwrites it.

In one embodiment, a hard pinning may be made permanent upon its immediate effect. For example, once a stroke type is pinned, no engine may attempt to change it. This makes a hard pinning triumph all soft pinning and earlier hard pinnings. Soft pinnings (i.e., gesture hints) may be saved as gesture nodes in the parse tree. In every re-parse, all gesture hints may be re-parsed and re-applied if recognized as active. For example, after a line divider is applied, the divider gesture becomes inactive because it no longer intersects with any lines. Later a stroke type change may trigger the merging of the two lines across the divider gesture. In this situation, the divider gesture will become active again and reverse the propagated effect. Conflicts between gesture hints may be resolved by their timestamps—later gestures overwrite earlier ones in case of conflicts.

Input methods may include: (1) For structures whose grouping is visualized by their spans, drawing a connector between the visual cues of a pair indicates merging them and drawing a divider across a visual cue indicates splitting the node at the position of intersection. Lines and writing regions are visualized by spans. (2) For structures whose grouping is one dimensional and hence can be visualized by boundary symbols, drawing a boundary symbol indicates splitting at that position and crossing out a boundary symbol indicates merging the pair on its sides. Words and paragraphs may be visualized by boundary symbols such as '>'. Of course, other methods of input and symbols may be implemented without departing from a scope and spirit of the present disclosure.

In a system according to embodiments, gesture recognition relies more on context (relationship to surrounding nodes and visual cues) than its own properties. Isolated shape recognition may not be very useful for this reason. According to some embodiments, a heuristic parsing algorithm may be used, while other methods may also be employed. Such an algorithm may test for different gesture types approximately in the frequency order and latch onto the first type that passes the test.

A stroke set hint may be applied when a parsed symbol gesture immediately follows a lasso selection. Symbols may be selected to be intuitive for the intended actions. For example, 'd' may stand for "Set To Drawing", 'g' for "Group As Line", and '/' for "Set To Call Out."

Stroke set hints may be either hard pinning or soft pinning. Persisting pinning for leaf level nodes such as words, lines, and drawings may be achieved by sprinkling checks for pinned nodes in all engines that touch the structures. For higher-level nodes such as writing regions, not only their own grouping may need to be preserved, but also the effect may have to be percolated downwards. For example, if a region is pinned, strokes from inside and outside cannot be grouped into the same line. According to one embodiment, each pinned higher-level node may be wrapped in a group node, groups and the rest of tree treated as sub-branches, and every sub-branch parsed independently.

In diagram 100 of FIG. 1, application 110 represents a user application for ink entry and other purposes such as word processing, presentation processing, spreadsheet processing, and the like. Application 110 may provide ink, document, or image information to parsing platform 102 and request parsed document in return. Application 110 may receive document 112 through user interface 108 or from another source. Parsing platform 102 works with application 110 and provides parsing services. Parsing platform 102 includes an engine stack 106 comprising various engines such as a writing/drawing classification engine for classifying ink strokes into writing and drawing, a line grouping engine for grouping writing strokes into line structures and a block grouping engine for grouping writing lines into writing regions.

Engine stack 106 performs parsing related operations and interacts with application 110 through application interface 104. A parsing platform according to embodiments, is not only capable of parsing heterogeneous data such as ink, text, images, and the like, but it can also relate connections between these heterogeneous data. For example, a callout may relate an image to an adjacent text, and the parsing platform may be capable of determining that relationship. Moreover, parsing platform 102 may perform parsing correction operations based on user indications through user interface 108 such as gestures and provide corrected data (text, images, graphics, etc.) back to application 110.

Embodiments described herein refer to applications and or modules such as those discussed above, but they are not limited to specific applications. Any application or hosted service that performs parsing with correction based on user indications may be implemented using the principles described herein. Such applications and/or modules may be implemented locally on a single computing device or in a distributed manner over a networked system such as a hosted parsing service.

Figure 2:
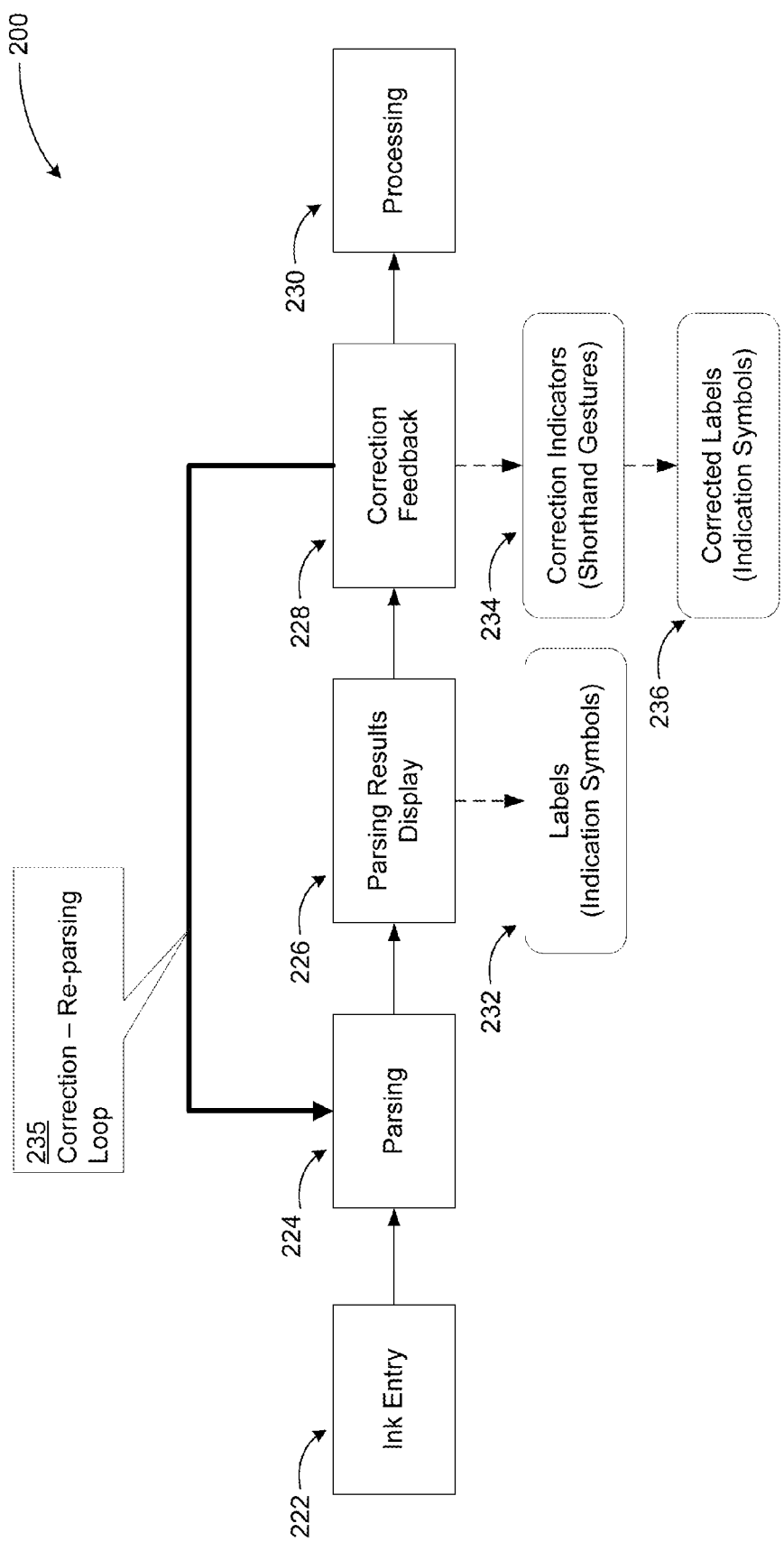
FIG. 2 illustrates major blocks in parsing with correction feedback.

FIG. 2 illustrates major blocks in parsing with correction feedback. Operations in a system according to embodiments begin with ink entry 222. Parsing is performed (224) on received data. Symbol classification and grouping techniques may be utilized in parsing data. There may be many engines and components in the parsing platform each focusing on a subset of the classification and grouping tasks. One example engine is a stroke classifier which may use stroke and context features and a neural net classifier to distinguish writing and drawing strokes. Another example is a line grouping engine which may group writing strokes into lines according to certain page layout optimization criteria. In an example system, ink strokes may be rendered into image features first. Then, these image features and other heuristically designed stroke/line/background features may be provided to a classifier to learn a set of decision trees. These decision trees may then be used to classify drawing strokes in an ink or mixed ink-and-text document. The system may also identify the context of the parsed data, and create corresponding links in the parse tree data structure.

In block 226, parsing results are provided to a user application for display to the user such that the user can correct parsing errors. Feedback from the user is received (228) and provided to the parsing platform for re-analysis and correction of parsed data. According to some embodiments, this may be accomplished by providing the parsed data to the user with labels (indication symbols) 232 such as those described below and receiving correction indicators such as shorthand gestures 234 or similar correction input. Once the re-analysis is completed, the corrected data may be provided to the user application with corrected labels (indication symbols) 236. This process may be an iterative or a continuous process. If it is iterative, the user provides further feedback upon receiving display of corrected document and the data is re-analyzed each time the user indicates the corrections can be accepted. In a continuous correction process the data is immediately re-analyzed, corrected, and provided to the user application. The potentially looped nature of correction—re-parsing process is indicated (235) in the diagram. The user application may not only display the corrected document to the user, but also perform other processes (230) such as those related to word processing, spreadsheets, presentations, and the like.

The blocks and operations discussed above are for exemplary purposes. Embodiments are not limited to the example blocks and may be implemented with fewer or more blocks and operations.

Figure 3:
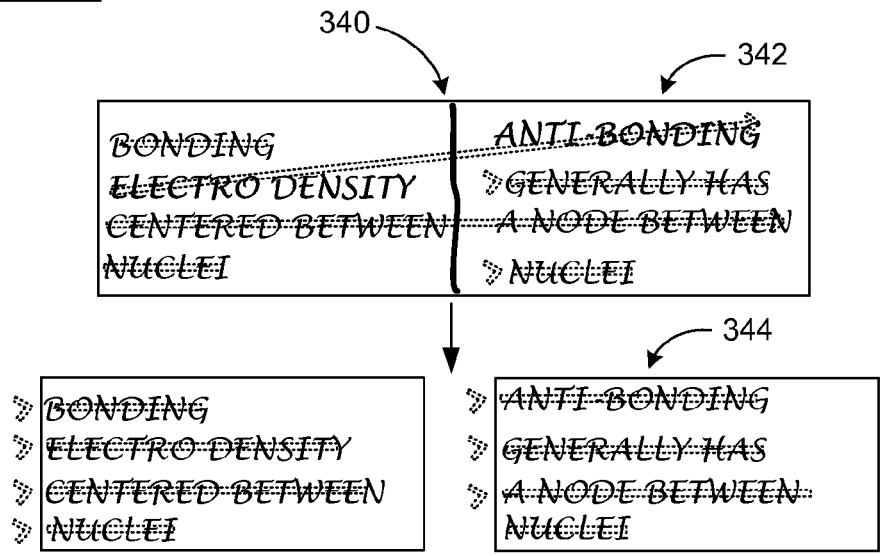
FIG. 3 illustrates example gestures in parsing correction according to embodiments with before and after screenshots.
Figure 3:
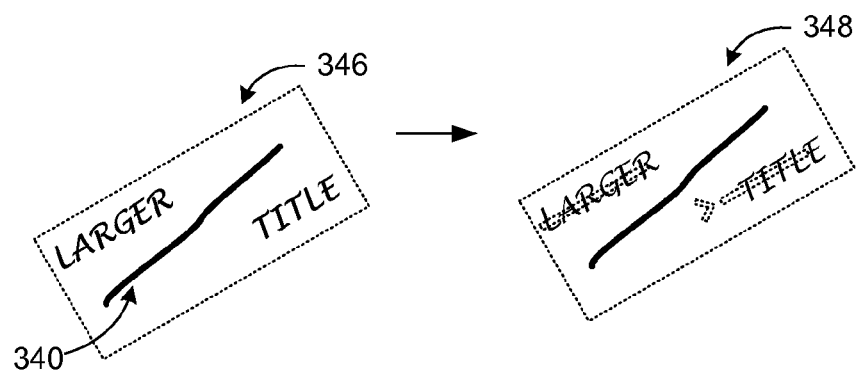
Figure 3:
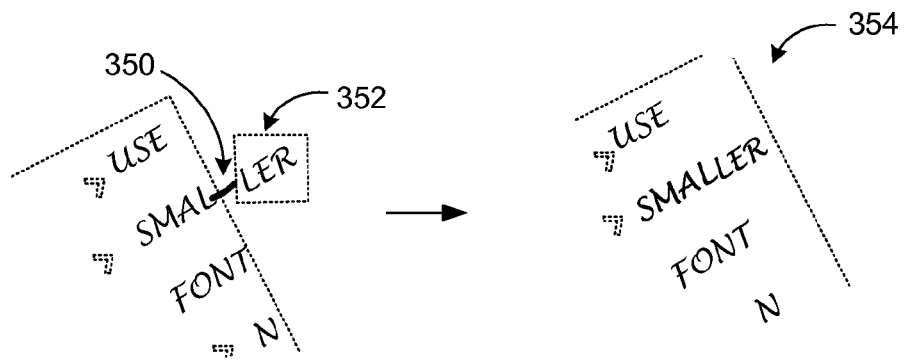

FIG. 3 illustrates example gestures in parsing correction according to embodiments with before and after screenshots. Different forms of labels or indicator symbols may be used to convey to the user the parsing results without interfering with the user's perception of the content of the parsed document. For example, a color scheme may be employed along with a limited number of intuitive symbols to indicate word/paragraph starts and ends, lines, groups, indentations, etc. Text and drawings may be presented in different colors to enable the user to distinguish them easily. These indicator symbols may then be used to interact with the user and receive correction gestures. For example, a line across an indicator symbol may be perceived as indicating a request to remove that symbol and reverse the associated parsing operation. Similarly, lines connecting indicator symbols may be interpreted as a command to couple the operations associated with those indicator symbols.

Mistakenly connected or separated lines are one of the more common errors in parsing document. Thus, a major category of correction indicators is about correcting line mistakes. Divider gestures may be used to correct over-grouping mistakes for a single line or multiple lines at once. Screenshot 342 illustrates four lines of handwritten notes where the light grey lines indicate to the user lines as determined by the parsing engine. Light grey boundary symbols indicate detected paragraphs with the words at the beginning of a perceived paragraph being presented in bold fashion. In the before screenshot (342) a vertical line divider gesture 340 is received from the user. As a result, the two line over-grouping mistakes are corrected. A parser according to embodiments propagates any correction to all affected structures as well. In this example screenshot, the correct writing region grouping is obtained as a result.

Screenshot 346 is the before picture where two words written at an angle are perceived by the parsing engine as a single line. Upon receiving a horizontal line divider gesture 340, the text is split into two lines in the after screenshot 348 with new line indicators and boundary symbols inserted (light grey).

Screenshots 352 and 354 are examples for use of a line connector gesture. In screenshot 352, a portion of the handwritten word "smaller" is separated by the parsing engine in error. A line connector gesture 350 is provided by the user. The system connects the two separate regions coupling the split pieces of the word "smaller" in one line in after screenshot 354.

Figure 4:
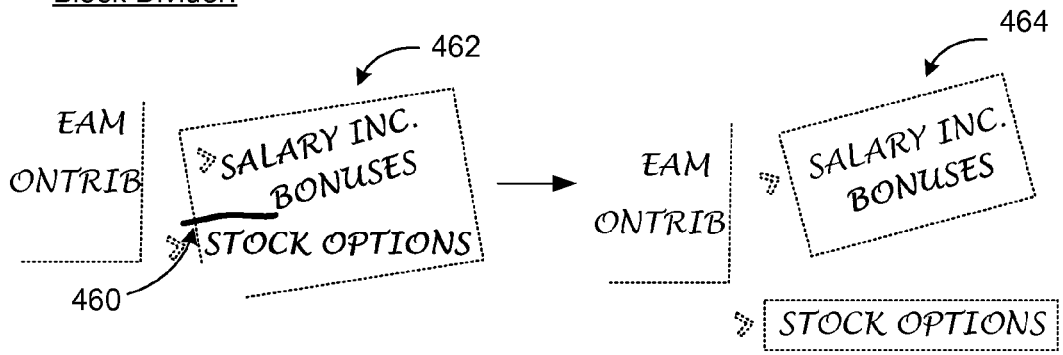
FIG. 4 illustrates further example gestures in parsing correction according to embodiments with before and after screenshots.
Figure 4:
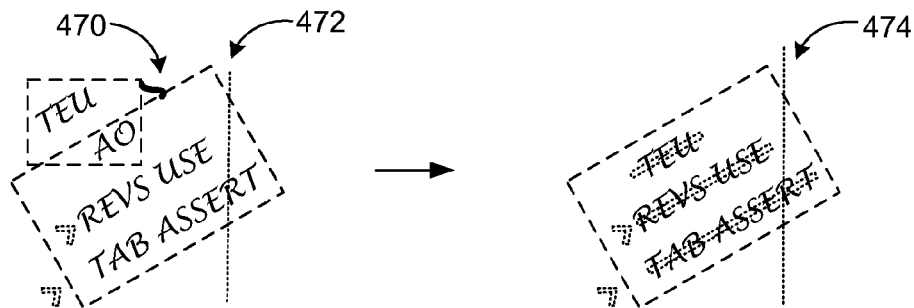
Figure 4:
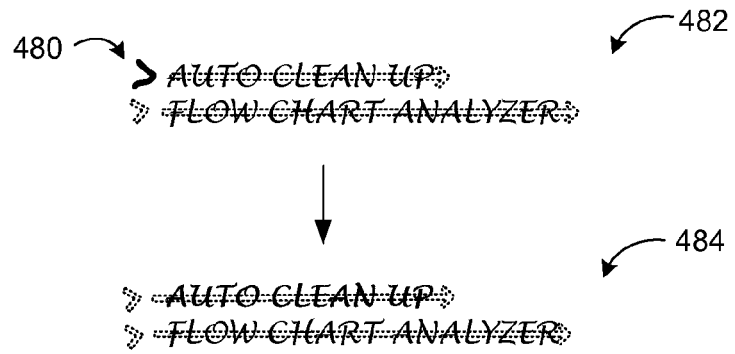
Figure 4:
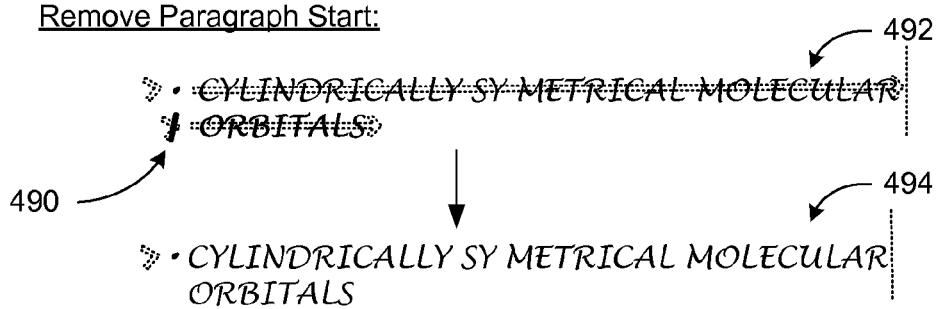

FIG. 4 illustrates further example gestures in parsing correction according to embodiments with before and after screenshots. Other categories of correction gestures may include block dividers or connectors, paragraph/word starters or removers, some of which are shown as example implementations in the figure.

Another example of corrective action is division or connection of a block. In screenshot 462, a group of words are combined as a group (indicated by the grey box around them). A block divider gesture 460 is inserted by the user resulting in the block being split into two blocks in the after screenshot 464.

Similarly, two separate blocks as shown in before screenshot 472 may be connected by insertion of connector gesture 470 between the separated blocks resulting in the combined block of after screenshot 474.

As mentioned before, words at the beginning of a paragraph may be indicated to a user by displaying them in bold (alternatively, symbols may be used to indicate a paragraph start). In screenshot 482, the line including words "auto cleanup" is not indicated as being a paragraph start. The user inserts a boundary symbol as paragraph start correction gesture (480) and the first line is made a paragraph start in the after screenshot 484.

Similarly, false paragraph starts such as the one shown in screenshot 492 may be removed by insertion of a removal gesture 490 (e.g. a short line across the paragraph start indicator) and result in after screenshot 494.

Figure 5:
FIG. 5 illustrates example gesture commands that may be used in conjunction with parsing correction according to embodiments.

FIG. 5 illustrates example gesture commands that may be used in conjunction with stroke set hints for parsing correction according to embodiments. Alternatively to gestures, these commands may be provided to the user in a pop-up menu, hovering marking wheel, in a toolbar, and the like and the user prompted to select from the available options.

Table 520 illustrates other commands in column 522 for setting a mode of the parsing operation (e.g. set to writing, set to drawing), for correction actions (e.g. various grouping of dividing commands), and other commands that indicate to the parsing engine selections of the user in the parsed document for corrective actions (e.g. vertical and horizontal range indicators, container indicators, etc.).

Characters associated with these commands are shown in column 524 in corresponding rows followed by the example handwritten gestures for each of the commands in column 526. Again, the commands may be provided by handwritten gestures as shown on the table or by other means through the interactive user interface.

Embodiments are not limited to the example gestures, commands, and correction indicators provided in FIG. 3 through 5. An engine support system for parsing correction user interfaces may be implemented with additional gestures, indicators, commands, and the like.

FIG. 5 is an example networked environment, where embodiments may be implemented. While a parsing platform with support for correction user interfaces may commonly be implemented on individual computing devices as part of one or more applications, with increased use of distributed applications and networked systems, embodiments may also be realized in networked environments. Diagram 600 illustrates such an example environment. Server 642 may host a parsing service in conjunction with data stores 644 and 648 (the latter being managed by a database server 646). The service may receive input from various users through their client devices (client devices 631-633) and applications (634-636) executed on those devices through network(s) 630.

Upon receiving the initial ink entries and performing the first parsing operations, the service may provide the parsed document(s) to the users for corrective feedback labeled with indication symbols. When the user feedback (e.g. in form of handwritten gestures) is received the document may be re-analyzed and corrections performed per user instructions. Such a system may be configured in a distributed manner over a number of physical and virtual clients and servers. It may also be implemented in un-clustered systems or clustered systems employing a number of nodes communicating over one or more networks (e.g. network(s) 630).

Such a system may comprise any topology of servers, clients, Internet service providers, and communication media. Also, the system may have a static or dynamic topology, where the roles of servers and clients within the system's hierarchy and their interrelations may be defined statically by an administrator or dynamically based on availability of devices, load balancing, and the like. The term "client" as used in this portion may refer to a client application or a client device. While a networked system implementing engine support for parsing correction user interfaces may involve many more components, relevant ones are discussed in conjunction with this figure.

Network(s) 630 may include a secure network such as an enterprise network, an unsecure network such as a wireless open network, or the Internet. Network(s) 630 provide communication between the nodes described herein. By way of example, and not limitation, network(s) 630 may include wired media such as a wired network or direct-wired connection, and wireless media such as acoustic, RF, infrared and other wireless media.

Figure 6:
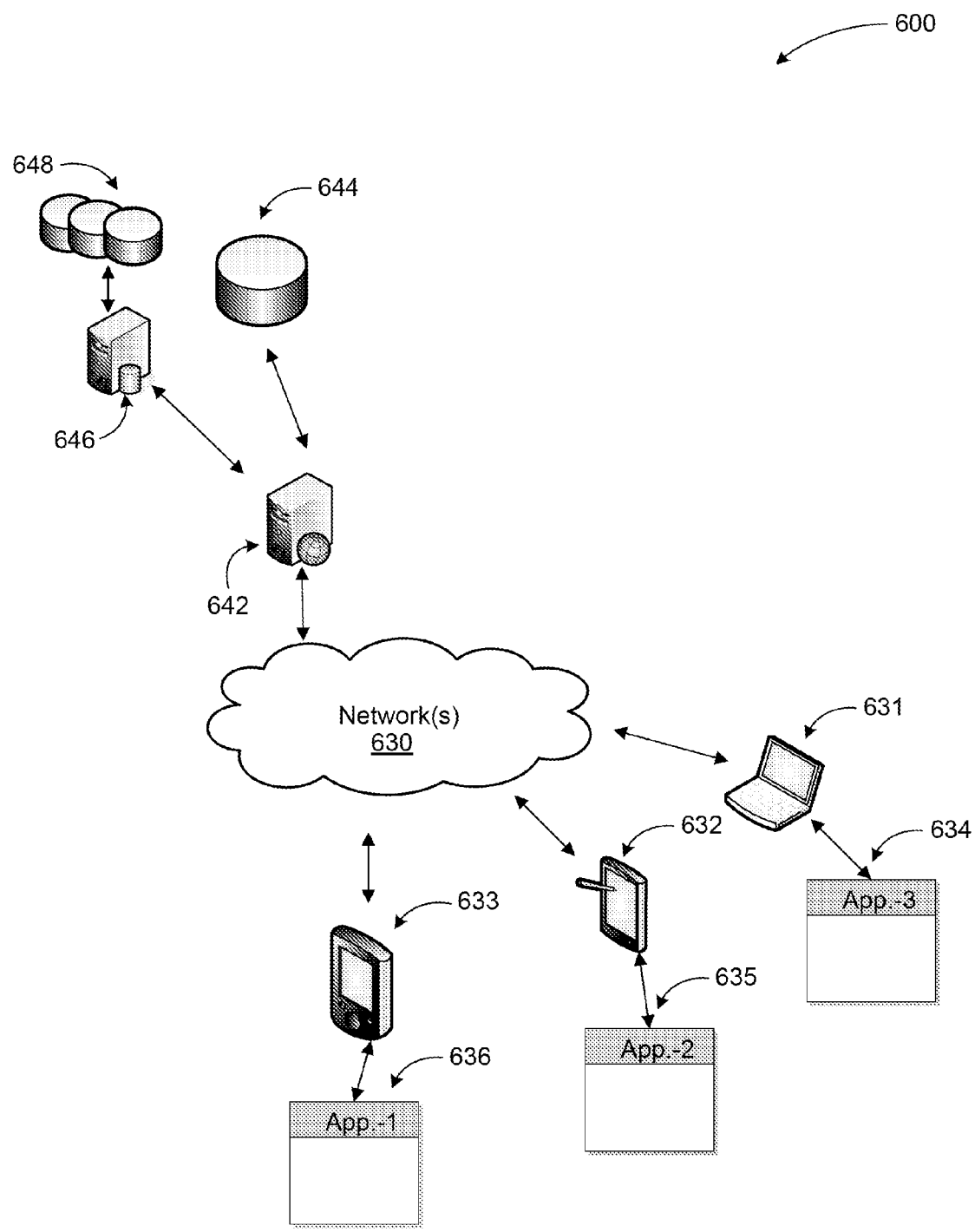
FIG. 6 is a networked environment where a parsing system with engine support for parsing correction user interfaces according to embodiments may be implemented.

Many other configurations of computing devices, applications, data sources, data distribution systems may be employed to implement a parsing system according to embodiments. Furthermore, the networked environments discussed in FIG. 6 are for illustration purposes only. Embodiments are not limited to the example applications, modules, or processes.

Figure 7:
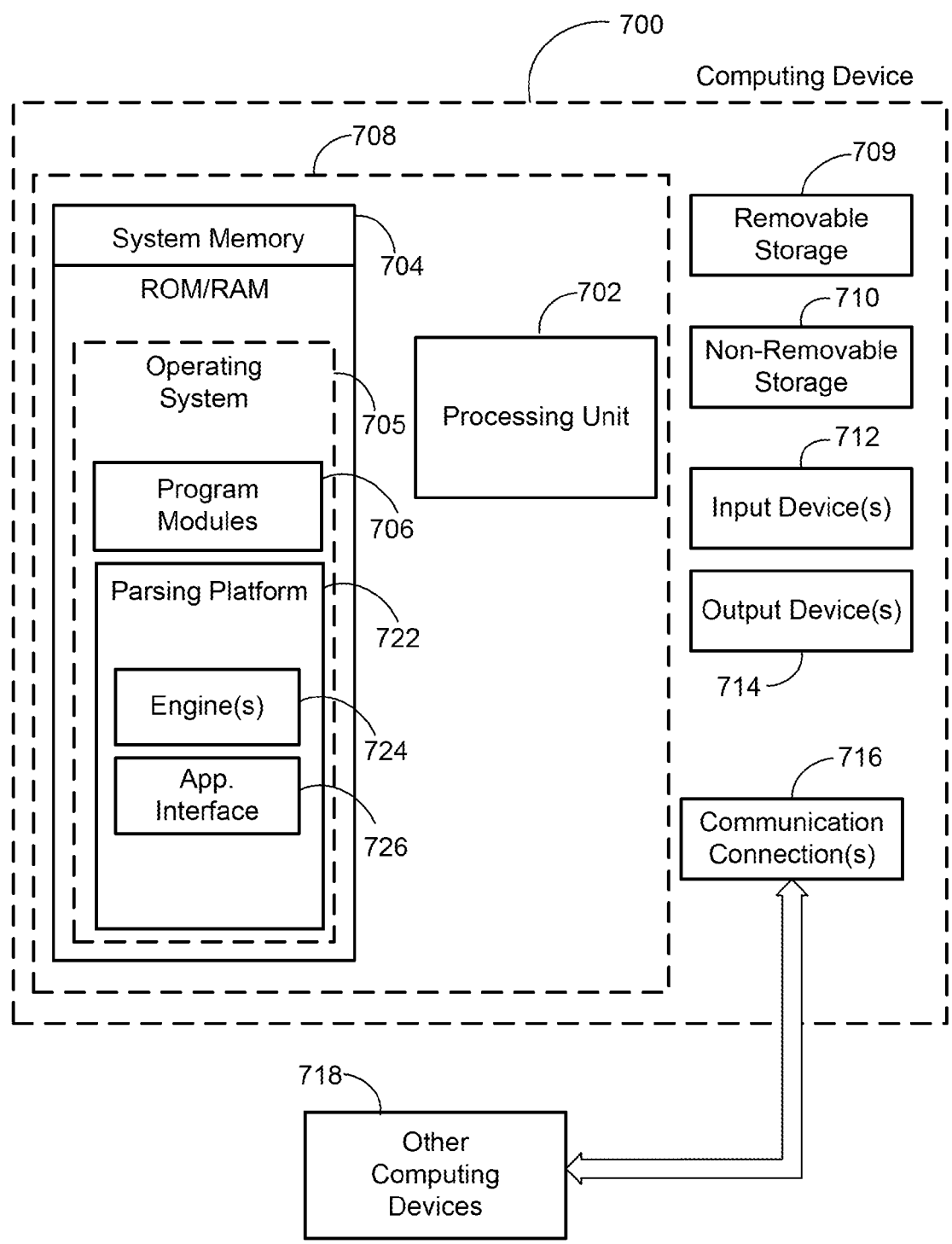
FIG. 7 is a block diagram of an example computing operating environment, where embodiments may be implemented.

FIG. 7 and the associated discussion are intended to provide a brief, general description of a suitable computing environment in which embodiments may be implemented. With reference to FIG. 7, a block diagram of an example computing operating environment is illustrated, such as computing device 700. In a basic configuration, the computing device 700 may be a computer with ink entry capabilities. Computing device 700 may typically include at least one processing unit 702 and system memory 704. Computing device 700 may also include a plurality of processing units that cooperate in executing programs. Depending on the exact configuration and type of computing device, the system memory 704 may be volatile (such as RAM), non-volatile (such as ROM, flash memory, etc.) or some combination of the two. System memory 704 typically includes an operating system 705 suitable for controlling the operation of a networked personal computer, such as the WINDOWS® operating systems from MICROSOFT CORPORATION of Redmond, Wash. The system memory 704 may also include one or more software applications such as program modules 706, parsing platform 722, engines 724, and application interface 728.

Parsing platform 722 performs parsing operations using its engine stack comprising engines 724 and application interface 726. Parsed document(s) labeled with indication symbols are then provided to the user application for display to the user and entry of correction commands. Correction commands (e.g. in form of gestures) are received from the user application and the document(s) re-analyzed for performing the corrections. This basic configuration is illustrated in FIG. 7 by those components within dashed line 708. The functionality of parsing platform 722 does not have to be assigned to the distinct modules as described here. The above disclosed functionality may be performed by more or fewer modules or all by the same application (or service).

The computing device 700 may have additional features or functionality. For example, the computing device 700 may also include additional data storage devices (removable and/or non-removable) such as, for example, magnetic disks, optical disks, or tape. Such additional storage is illustrated in FIG. 7 by removable storage 709 and non-removable storage 710. Computer storage media may include volatile and non-volatile, removable and non-removable media implemented in any method or technology for storage of information, such as computer readable instructions, data structures, program modules, or other data. System memory 704, removable storage 709, and non-removable storage 710 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 700. Any such computer storage media may be part of device 700. Computing device 700 may also have input device(s) 712 such as keyboard, mouse, pen, voice input device, touch input device, etc. Output device(s) 714 such as a display, speakers, printer, etc. may also be included. These devices are well known in the art and need not be discussed at length here.

The computing device 700 may also contain communication connections 716 that allow the device to communicate with other computing devices 718, such as over a wireless network in a distributed computing environment, for example, an intranet or the Internet. Other computing devices 718 may include web servers, database servers, file servers, provider servers, and the like. Communication connection 716 is one example of communication media. Communication media may typically be embodied by computer readable instructions, data structures, program modules, or other data in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media.

The claimed subject matter also includes methods of operation. These methods can be implemented in any number of ways, including the structures described in this document. One such way is by machine operations, of devices of the type described in this document.

Another optional way is for one or more of the individual operations of the methods to be performed in conjunction with one or more human operators performing some. These human operators need not be collocated with each other, but each can be only with a machine that performs a portion of the program.

Figure 8:
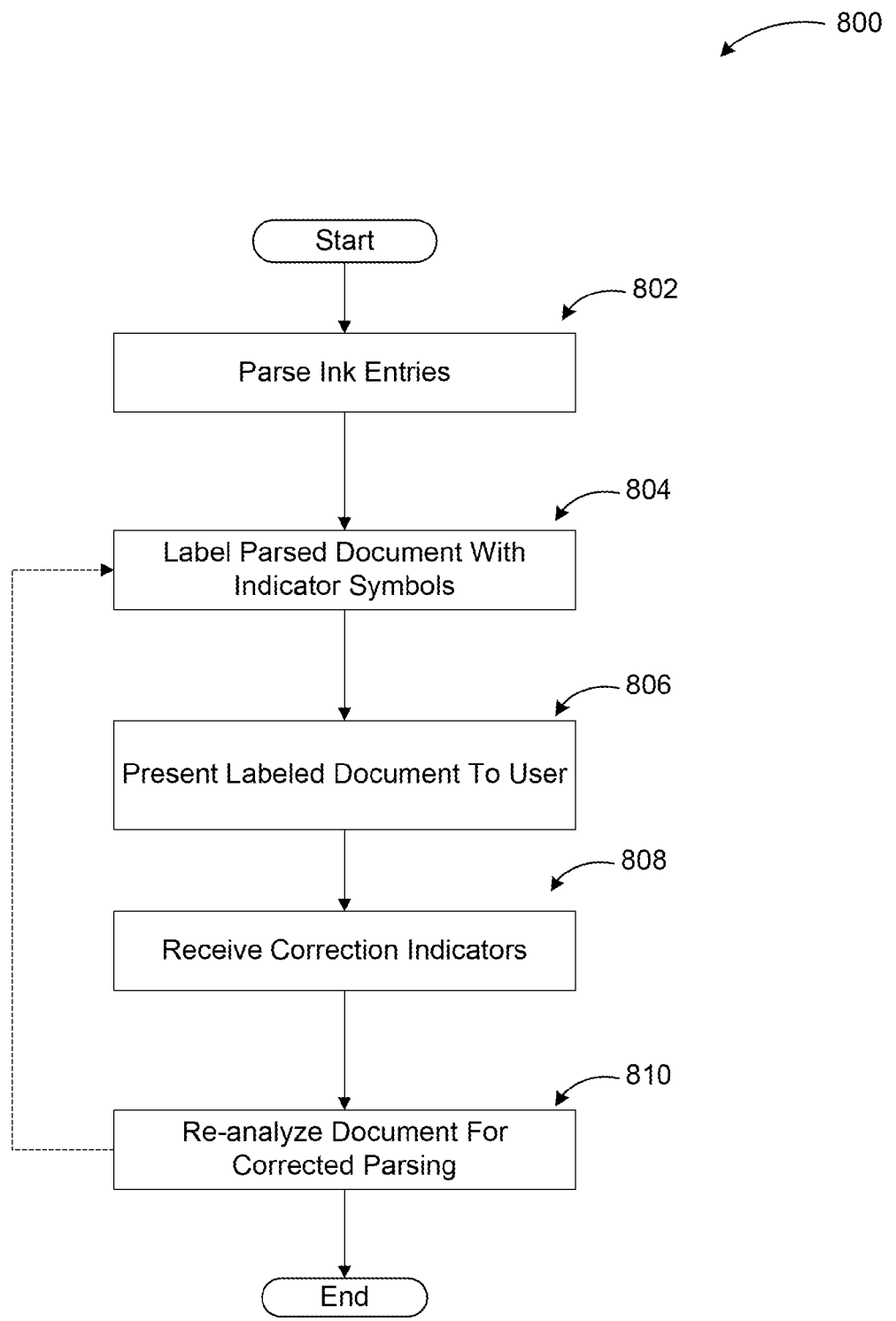
FIG. 8 illustrates a logic flow diagram of an example process of correcting parsing errors in a system according to embodiments.

FIG. 8 illustrates a logic flow diagram of example process 800 of correcting parsing errors in a system according to embodiments. Process 800 may be implemented in a computing device with ink entry capabilities.

Process 800 begins with operation 802, where ink entries received from the user are parsed by the system and a parsed document is generated. Processing continues to operation 804 from operation 802.

At operation 804, the parsed document (text and/or graphics) is labeled with indicator symbols such as those described previously. Any scheme of indication may be used to implement embodiments. Processing moves to operation 806 from operation 804.

At operation 806, the labeled document is presented to the user for corrective actions. Processing moves from operation 806 to operation 808, where correction indicators such as handwritten gestures, icon selections, menu item selections, etc. are received from the user. Processing advances from operation 808 to operation 810.

At operation 810, the document is re-analyzed for incorporating the correction requests by the user through the correction indicators. The corrected document may then be provided to the user again. As mentioned previously, the process may be an iterative one, where the corrections are performed as the user inserts their correction indicators, after a predefined number of correction indicators are received, upon user indication, or another trigger mechanism. After operation 810, processing moves to a calling process for further actions. A dashed loop is shown between operations 810 and 804 to illustrate that the correction feedback, re-parsing, and display of re-parsed data can be an iterative or continuous loop that may be performed until the user stops or all corrections are completed.

The operations included in process 800 are for illustration purposes. Engine support for parsing correction user interfaces may be implemented by similar processes with fewer or additional steps, as well as in different order of operations using the principles described herein.

The above specification, examples and data provide a complete description of the manufacture and use of the composition of the embodiments. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims and embodiments.

What is claimed is:

1. A method to be executed at least in part in a computing device to provide engine support for parsing correction user interfaces, the method comprising:
   parsing data based on ink entries;
   labeling parsed data with indicator symbols specifying at least one from a set of: a position, a grouping, a relationship, and a type of parsed data;
   presenting the labeled parsed data to a user for corrective actions, the corrective actions comprising employing an order of correction to support the correction of a most annoying error in the parsed data before the correction of other errors in the parsed data, regardless of a structure involving the most annoying error, to minimize a number of operations needed for the corrective actions;
   receiving correction indicators from the user;
   re-parsing the labeled data based on a context of the received correction indicators with existing parsing results; and
   presenting the corrected parsed data to the user.

2. The method of claim 1, wherein re-parsing the labeled data includes processing correction indicators in an arbitrary order for increased user flexibility and selecting an appropriate propagation for minimizing a number of corrections.

3. The method of claim 1, wherein the correction indicators include at least one from a set of: handwritten correction gestures, corrective action icons, drop-down menu items, pop-up menu items, and marking wheel items.

4. The method of claim 3, wherein a number and a type of correction indicators are selected such that a cognitive load on the user is minimized.

5. The method of claim 1, further comprising:
   preserving a correction history when receiving the correction indicators from the user such that the correction history is respected and conflicts are resolved during re-parsing of the labeled data.

6. The method of claim 5, wherein the conflicts are resolved according to a time stamp of each correction indicator.

7. The method of claim 1, further comprising:
   employing a heuristic parsing algorithm for parsing correction indicators if the correction indicators include handwritten gestures, wherein the heuristic algorithm tests for different gesture types based on an order of their frequency and latches onto a gesture type that passes the test.

8. The method of claim 1, wherein the data includes text and drawings, and wherein the indicator symbols are selected according to an intuitive scheme arranged to distinguish between elements of the text and the drawings.

9. The method of claim 1, wherein the receiving of the correction indicators, re-parsing of the labeled data, and presenting of the corrected data process is at least one from a set of: a one-time process triggered by user indication, an iterative process repeated until stopped by the user, and a continuous process repeated until stopped by the user.

10. A computing device arranged to provide engine support for parsing correction user interfaces, the computing device comprising:
    a user application with a user interface for accepting ink entries and displaying parsing results to a user;
    a parsing platform configured to:
    parse data comprising at least one of text and drawings based on ink entries;
    label the parsed data with indicator symbols according to a predefined intuitive scheme for reducing a cognitive load on the user, the indicator symbols specifying at least one from a set of: a position, a grouping, a relationship, and a type of parsed data;
    provide the labeled parsed data to the user application for corrective actions, the corrective actions comprising employing an order of correction to support the correction of a most annoying error in the parsed data before the correction of other errors in the parsed data, regardless of a structure involving the most annoying error, to minimize a number of operations needed for the corrective actions;
    receive correction indicators from the user application in form of handwritten gestures;
    re-parse the labeled data based on a context of the received correction indicators with existing parsing results; and
    provide the corrected parsed data to the user application for presentation to the user.

11. The computing device of claim 10, wherein the correction indicators in form of the handwritten gestures include:
    a line gesture for one of connecting and dividing parsed data structures whose grouping is visualized by their spans;
    a boundary symbol for separating parsed data structures whose grouping is one dimensional; and
    a boundary removal symbol for merging separate parsed data structures whose grouping is one dimensional.

12. The computing device of claim 11, wherein the correction indicators in form of the handwritten gestures further include:
    a set of data structure selection gestures; and
    a set of characters representing commands for one of grouping and separating selected data structures.

13. The computing device of claim 11, wherein the correction indicators in form of the handwritten gestures further include another set of characters representing commands associated with parsing operations.

14. The computing device of claim 10, wherein the receiving of correction indicators, re-parsing of the labeled data, and providing of the corrected data process is iterative, and wherein each gesture that is parsed as active is re-parsed and re-applied during each re-parse.

15. The computing device of claim 10, wherein the parsing platform is a hosted parsing service interacting with a plurality of user applications executed in a number of computing devices.

16. A computer-readable storage device with instructions encoded thereon which, when executed by a computing device, will cause the computing device to perform a method to provide engine support for parsing correction user interfaces, the method comprising:
    receiving data comprising text and drawings from a user application based on ink entries from a user;
    parsing the received data in a tree structure following an order of lines, writing regions, and words;
    if a high level node in the tree structure is pinned, preserving its grouping such that remaining branches of the tree structure are treated as sub-branches and each sub-branch is parsed independently;
    labeling parsed data with indicator symbols according to a predefined color and shape scheme specifying at least one from a set of: a position, a grouping, a relationship, and a type of parsed data;
    providing the labeled parsed data to the user application;
    receiving correction indicators comprising a set of gestures and a set of stroke-set hints from the user application;

re-parsing the labeled data based on a context of the received correction indicators with existing parsing results;

providing the corrected parsed data to the user application; and repeating the receiving the correction indicators, re-parsing the labeled data, and providing the corrected parsed data process until a stop indication is received from the user application.

17. The computer-readable storage device of claim 16, wherein a stroke-set hint is created by clicking on an indicator button and inserting a symbol gesture.

18. The computer-readable storage device of claim 16, wherein the set of gestures and the set of stroke-set hints are unified.

* * * * *